US010820095B2

(12) United States Patent
Chien

(10) Patent No.: US 10,820,095 B2
(45) Date of Patent: Oct. 27, 2020

(54) AUDIO CODEC CIRCUIT CAPABLE OF AVOIDING POP-NOISE

(71) Applicant: Realtek Semiconductor Corp., Hsinchu (TW)

(72) Inventor: Chih-Kang Chien, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 72 days.

(21) Appl. No.: 16/371,557

(22) Filed: Apr. 1, 2019

(65) Prior Publication Data

US 2019/0313186 A1 Oct. 10, 2019

(30) Foreign Application Priority Data

Apr. 9, 2018 (TW) ............................ 107112173 A

(51) Int. Cl.
*H04B 15/00* (2006.01)
*H04R 3/00* (2006.01)
*H04R 5/04* (2006.01)

(52) U.S. Cl.
CPC ................ *H04R 3/00* (2013.01); *H04R 5/04* (2013.01)

(58) Field of Classification Search
CPC .................................. H04R 3/00; H04R 5/04
USPC ........................................................ 381/94.5
See application file for complete search history.

(56) References Cited

U.S. PATENT DOCUMENTS 9,479,863 B2 10/2016 Chien
2005/0195991 A1 * 9/2005 Wang ...................... H03F 1/305 381/94.5
2020/0045417 A1 * 2/2020 Li ........................... H03M 1/66

FOREIGN PATENT DOCUMENTS

CN 102801390 A 11/2012
CN 103346745 A 10/2013

OTHER PUBLICATIONS

Chinese Office Action for Chinese Application No. 201810337349.2, dated Aug. 26, 2020, with a partial English translation.

* cited by examiner

*Primary Examiner* — Katherine A Faley
(74) *Attorney, Agent, or Firm* — Birch, Stewart, Kolasch & Birch, LLP

(57) ABSTRACT

An audio codec circuit includes: an audio processing circuit; an output driver circuit for generating an analog output signal based on the output of the audio processing circuit; an analog signal pin for outputting the analog output signal to an active amplifier; a multifunction signal pin for providing different signal transmission functionalities according to the configuration of the audio processing circuit; at least one de-pop switch arranged between the analog signal pin and a first fixed-voltage terminal or between the multifunction signal pin and a second fixed-voltage terminal; and a de-pop switch control circuit, coupled with the audio processing circuit and the at least one de-pop switch, arranged to operably control the at least one de-pop switch based on the instruction from the audio processing circuit.

10 Claims, 2 Drawing Sheets

AUDIO CODEC CIRCUIT CAPABLE OF AVOIDING POP-NOISE

CROSS-REFERENCE TO RELATED APPLICATIONS

This application claims the benefit of priority to Patent Application No. 107112173, filed in Taiwan on Apr. 9, 2018; the entirety of which is incorporated herein by reference for all purposes.

BACKGROUND

The disclosure generally relates to an audio codec circuit and, more particularly, to an audio codec circuit capable of avoiding pop-noise.

Many audio playback devices utilize an active amplifier to further amplify an analog signal generated by the audio codec circuit, so as to drive a speaker in the subsequent stage. In most situations, the audio codec circuit and the active amplifier reside in different circuit chips.

Therefore, when the conventional audio codec circuit stops outputting signals because of entering into a power saving mode or that the power of the audio codec circuit is turned off, the power active amplifier may still remain in the normal operating status. In this situation, the active amplifier may no longer have a correct bias voltage because the signal input terminal of the active amplifier becomes floating. Furthermore, the signal input terminal of the active amplifier may also receive noises caused by various capacitive coupling effects or inductance effects.

As a result, it may cause the active amplifier to output erroneous signals to the speaker in the subsequent stage, thereby rendering the speaker to produce undesirable pop-noises.

SUMMARY

In view of the foregoing, it may be appreciated that a substantial need exists for methods and apparatuses that mitigate or reduce the problems above.

An example embodiment of an audio codec circuit capable of avoiding pop-noise is disclosed, comprising: an audio processing circuit; an output driver circuit arranged to operably generate a pair of differential analog output signals formed by a first analog signal Sout+ and a second analog signal Sout− according to an output signal of the audio processing circuit; a first analog signal pin coupled with the output driver circuit and arranged to operably output the first analog signal Sout+ to a first input terminal of an active amplifier; a second analog signal pin coupled with the output driver circuit and arranged to operably output the second analog signal Sout− to a second input terminal of the active amplifier; a multifunction signal pin coupled with the audio processing circuit and a common-mode voltage input terminal of the active amplifier, and arranged to operably provide different signal transmission functionalities according to a configuration of the audio processing circuit; at least one de-pop switch arranged between the first analog signal pin and a first fixed-voltage terminal, between the second analog signal pin and the first fixed-voltage terminal, or between the multifunction signal pin and a second fixed-voltage terminal; and a de-pop switch control circuit coupled with the audio processing circuit and the at least one de-pop switch, and arranged to operably control the at least one de-pop switch according to an instruction from the audio processing circuit.

Another example embodiment of an audio codec circuit capable of avoiding pop-noise is disclosed, comprising: an audio processing circuit; an output driver circuit arranged to operably generate an analog output signal Sout according to an output signal of the audio processing circuit; an analog signal pin coupled with the output driver circuit and arranged to operably output the analog output signal Sout to a first input terminal of an active amplifier; a multifunction signal pin coupled with the audio processing circuit and a second input terminal of the active amplifier, and arranged to operably provide different signal transmission functionalities according to a configuration of the audio processing circuit; at least one de-pop switch arranged between the analog signal pin and a first fixed-voltage terminal, or between the multifunction signal pin and a second fixed-voltage terminal; and a de-pop switch control circuit coupled with the audio processing circuit and the at least one de-pop switch, and arranged to operably control the at least one de-pop switch according to an instruction from the audio processing circuit.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
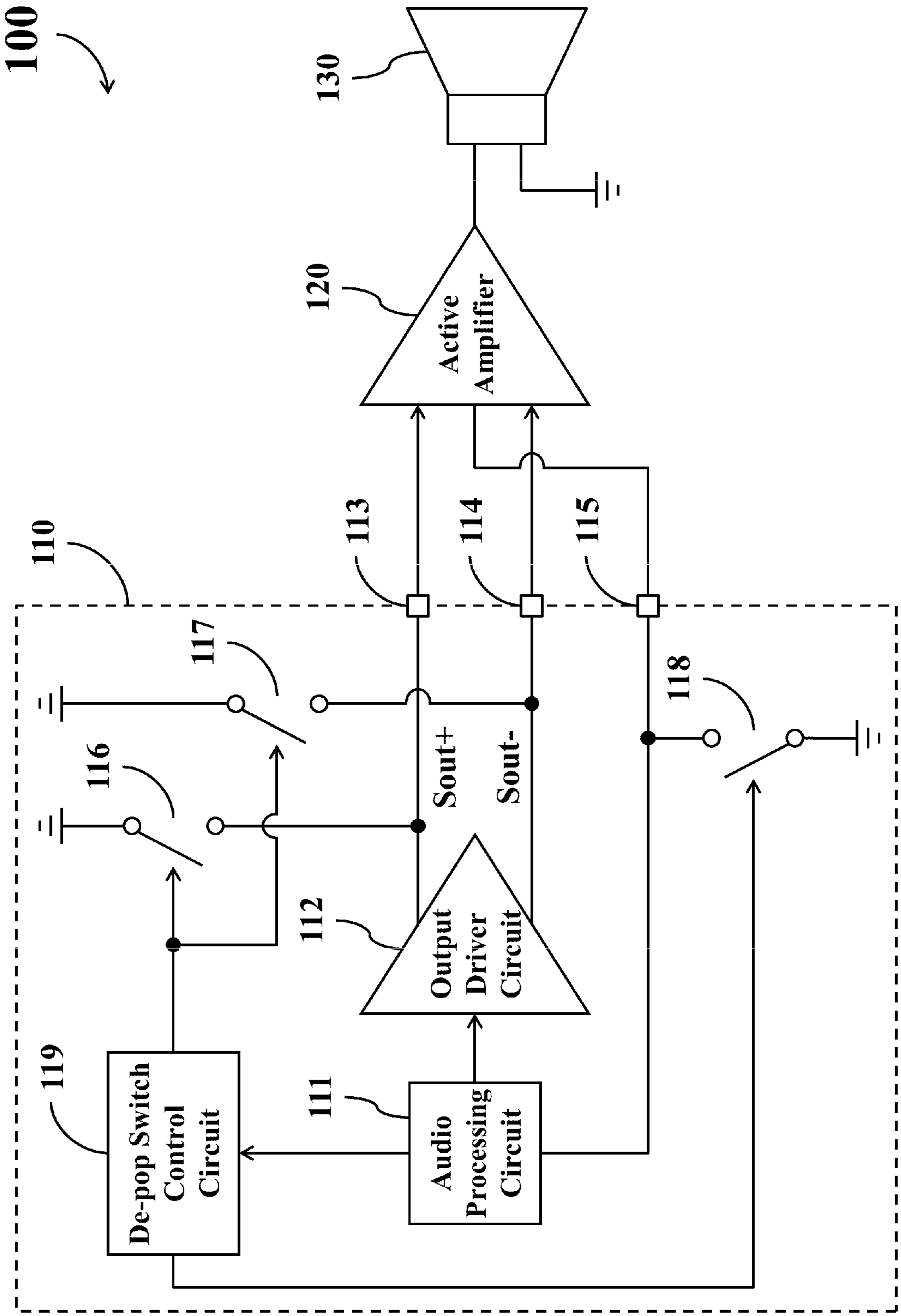
FIG. 1 shows a simplified functional block diagram of an audio playback device according to one embodiment of the present disclosure.

FIG. 1 shows a simplified functional block diagram of an audio playback device 100 according to one embodiment of the present disclosure. The audio playback device 100 comprises an audio codec circuit 110, an active amplifier 120, and a speaker 130.

As shown in FIG. 1, the audio codec circuit 110 comprises an audio processing circuit 111, an output driver circuit 112, a first analog signal pin 113, a second analog signal pin 114, a multifunction signal pin 115, at least one de-pop switch, and a de-pop switch control circuit 119.

In the audio codec circuit 110, the output driver circuit 112 is arranged to operably generate a pair of differential analog output signals formed by a first analog signal Sout+ and a second analog signal Sout− according to an output signal of the audio processing circuit 111.

The first analog signal pin 113 is coupled with a first output terminal of the output driver circuit 112, and is arranged to operably output the first analog signal Sout+ to a first input terminal of the active amplifier 120.

The second analog signal pin 114 is coupled with a second output terminal of the output driver circuit 112, and is arranged to operably output the second analog signal Sout− to a second input terminal of the active amplifier 120.

The multifunction signal pin 115 is coupled with an output terminal of the audio processing circuit 111 and a common-mode voltage input terminal of the active amplifier 120. The multifunction signal pin 115 is arranged to operably provide different signal transmission functionalities according to the configuration of the audio processing circuit 111, so as to act as different signal pins.

For example, in some applications, the audio processing circuit 111 may selectively configure the multifunction signal pin 115 to be a ground pin, a common-mode voltage output pin, a microphone input pin, or one of various signal pins, depending on the needs of the audio codec circuit 110.

The de-pop switch control circuit 119 is coupled with the audio processing circuit 111 and the de-pop switch, and is arranged to operably control the switching operation of the de-pop switch according to instructions of the audio processing circuit 111.

In the embodiment of FIG. 1, the audio codec circuit 110 comprises three de-pop switches, which are a first de-pop switch 116, a second de-pop switch 117, and a third de-pop switch 118.

As shown in FIG. 1, the first de-pop switch 116 is arranged between the first analog signal pin 113 and a first fixed-voltage terminal (e.g. a ground terminal). The second de-pop switch 117 is arranged between the second analog signal pin 114 and the first fixed-voltage terminal. The third de-pop switch 118 is arranged between the multifunction signal pin 115 and a second fixed-voltage terminal (e.g. a ground terminal).

In practice, the second fixed-voltage terminal may have the same voltage level as the first fixed-voltage terminal, or may have a voltage level different from that of the first fixed-voltage terminal.

The de-pop switch control circuit 119 may control the aforementioned first, second, and third de-pop switches 116, 117, and 118 according to the instructions of the audio processing circuit 111.

For example, when the audio processing circuit 111 and the output driver circuit 112 operate in a normal operation mode, the audio processing circuit 111 may instruct the de-pop switch control circuit 119 to turn off the first, second, and third de-pop switches 116, 117, and 118. In this situation, the first analog signal pin 113 outputs the first analog signal Sout+ generated by the output driver circuit 112 to the first input terminal of the active amplifier 120. The second analog signal pin 114 outputs the second analog signal Sout− generated by the output driver circuit 112 to the second input terminal of the active amplifier 120. Additionally, the multifunction signal pin 115 outputs a common-mode voltage generated by the audio processing circuit 111 to the common-mode voltage input terminal of the active amplifier 120.

In another embodiment, the audio processing circuit 111 may instruct the de-pop switch control circuit 119 to turn on the third de-pop switch 118 when the audio processing circuit 111 and the output driver circuit 112 operate in the normal operation mode, so that the multifunction signal pin 115 couples the common-mode voltage input terminal of the active amplifier 120 to the second fixed-voltage terminal. That is, the voltage level of the second fixed-voltage terminal is utilized to be the common-mode voltage of the active amplifier 120 in this situation.

The active amplifier 120 generates a corresponding amplified signal according to the differential analog output signals Sout+ and Sout− outputted from the output driver circuit 112, and utilizes the amplified signal to drive the speaker 130 in the subsequent stage.

In practice, the aforementioned first, second, and third de-pop switches 116, 117, and 118 may be realized with transistors of particular type, so that the first, second, and third de-pop switches 116, 117, and 118 can stay in a turned-on status by themselves, without using additional control voltage.

For example, each of the first, second, and third de-pop switches 116, 117, and 118 may be realized with a depletion type MOSFET (metal-oxide-semiconductor field-effect transistor), or may be realized with a junction field effect transistor (JFET).

Therefore, when the audio processing circuit 111 and the output driver circuit 112 enter into a power saving mode, or the power of the de-pop switch control circuit 119 is interrupted, the de-pop switch control circuit 119 stops outputting control signal to the first, second, and third de-pop switches 116, 117, and 118, but the first, second, and third de-pop switches 116, 117, and 118 would stay in the turned-on status in this moment. In other words, when the audio processing circuit 111 and the output driver circuit 112 operate in the power saving mode or the de-pop switch control circuit 119 is not powered, the first, second, and third de-pop switches 116, 117, and 118 would stay in the turned-on status. In this situation, the first de-pop switch 116 couples the first analog signal pin 113 to the first fixed-voltage terminal, the second de-pop switch 117 couples the second analog signal pin 114 to the first fixed-voltage terminal, while the third de-pop switch 118 couples the multifunction signal pin 115 to the second fixed-voltage terminal.

In practice, different functional blocks in the aforementioned audio codec circuit 110 may be realized with separate circuits, or may be integrated into a single audio codec IC.

It can be appreciated from the foregoing descriptions that the multifunction signal pin 115 plays the roles of different signal pins in different periods of time, and thus the pin count requirement of the audio codec circuit 110 can be reduced, which is beneficial to reducing the required circuit area of the audio codec circuit 110.

Furthermore, when the audio processing circuit 111 and the output driver circuit 112 enter into the power saving mode, or the power of the de-pop switch control circuit 119 is interrupted, the first, second, and third de-pop switches 116, 117, and 118 would stay in the turned-on status by themselves. Accordingly, the two signal input terminals of the active amplifier 120 are coupled with the first fixed-voltage terminal, while the common-mode voltage input terminal of the active amplifier 120 is coupled with the second fixed-voltage terminal. As a result, none of the two signal input terminals and the common-mode voltage input terminal of the active amplifier 120 would become floating.

On the other hand, when the audio processing circuit 111 and the output driver circuit 112 enter into the power saving mode, or the power of the de-pop switch control circuit 119 is interrupted, noises caused by various capacitive coupling effects or inductance effects at the signal input terminals and the common-mode voltage input terminal of the active amplifier 120 would be conducted to the fixed-voltage terminals (such as ground terminals) through the aforementioned first, second, and third de-pop switches 116, 117, and 118, instead of being received by the active amplifier 120.

In other words, the disclosed audio codec circuit 110 not only effectively avoids the signal input terminals and the common-mode voltage input terminal of the active amplifier 120 from becoming floating, but also effectively avoids the signal input terminals and the common-mode voltage input terminal of the active amplifier 120 from receiving noises caused by various capacitive coupling effects or inductance effects. In this way, it can avoid the active amplifier 120 from outputting erroneous signals to the speaker 130 in the subsequent stage, thereby eliminating or reducing the undesirable pop-noises generated by the speaker 130.

From another aspect, this means that the audio codec circuit 110 is allowed to enter into the power saving mode whenever needed, without causing the speaker 130 to generate pop-noises.

Please note that the output driver circuit 112 in the embodiment of FIG. 1 is realized with the circuit structure having differential outputs, but this is merely an exemplary embodiment, rather than a restriction to the practical implementations.

Figure 2:
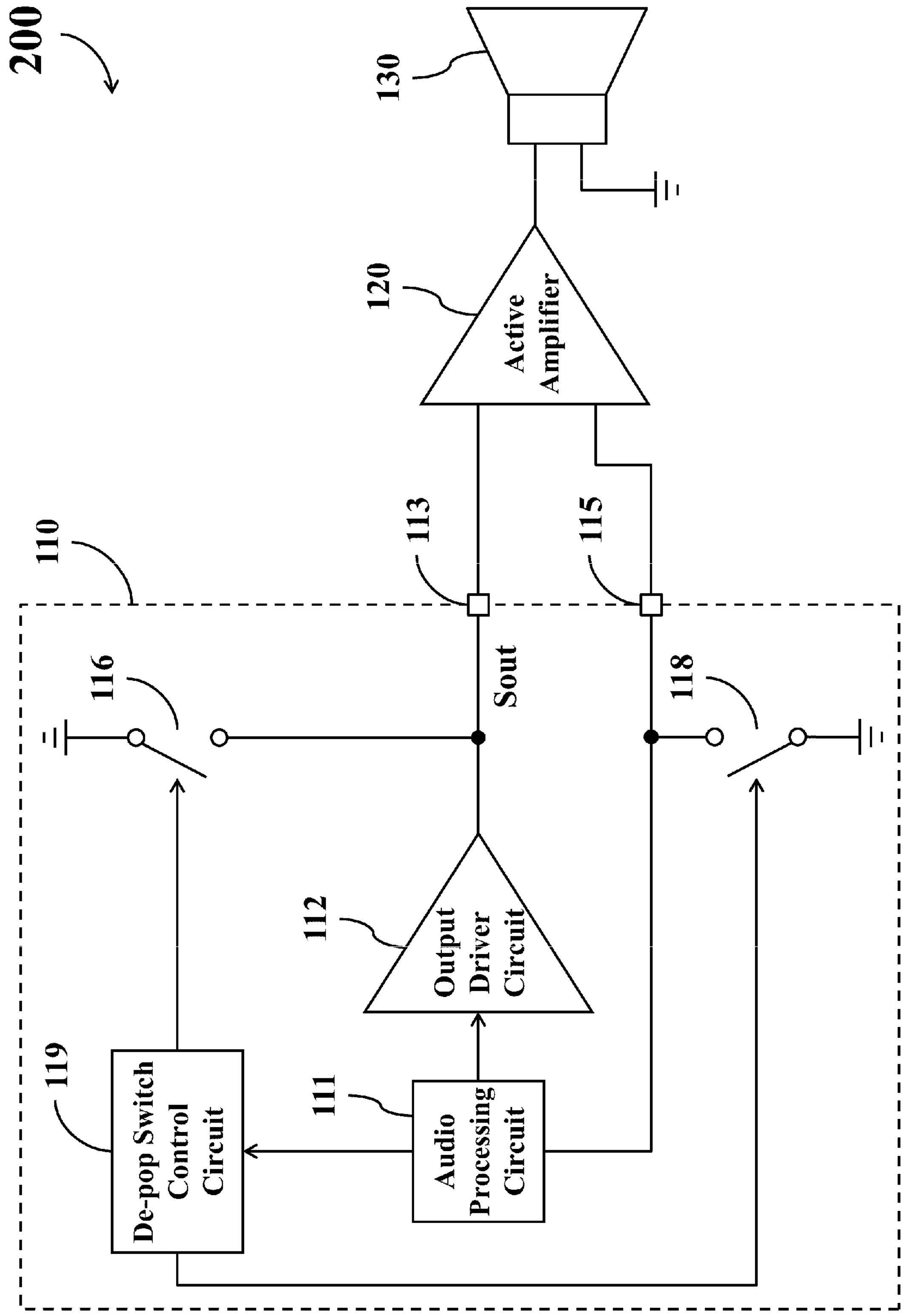
FIG. 2 shows a simplified functional block diagram of an audio playback device according to another embodiment of the present disclosure.

For example, FIG. 2 shows a simplified functional block diagram of an audio playback device 200 according to another embodiment of the present disclosure. In the embodiment of FIG. 2, the output driver circuit 112 is realized with a circuit structure having a single-ended output, and the analog signal pin 114 and the de-pop switch 117 in the embodiment of FIG. 1 are omitted in the embodiment of FIG. 2.

In this embodiment, the output driver circuit 112 is arranged to operably generate an analog output signal Sout according to signals outputted from the audio processing circuit 111. The analog signal pin 113 is coupled with an output terminal of the output driver circuit 112, and is arranged to operably output the analog output signal Sout generated by the driver circuit 112 to a first input terminal of the active amplifier 120.

The multifunction signal pin 115 is coupled with an output terminal of the audio processing circuit 111 and a second input terminal of the active amplifier 120. The multifunction signal pin 115 is arranged to operably provide different signal transmission functionalities according to the configuration of the audio processing circuit 111, so as to act as different signal pins.

For example, in some applications, the audio processing circuit 111 may selectively configure the multifunction signal pin 115 to be a ground pin, a microphone input pin, or one of various signal pins, depending on the needs of the audio codec circuit 110.

The de-pop switch control circuit 119 may control the de-pop switches 116 and 118 in FIG. 2 according to instructions of the audio processing circuit 111.

When the audio processing circuit 111 and the output driver circuit 112 in FIG. 2 operate in a normal operation mode, the audio processing circuit 111 may instruct the de-pop switch control circuit 119 to turn off the de-pop switch 116, so that the analog signal pin 113 outputs the analog output signal Sout generated by the output driver circuit 112 to the first input terminal of the active amplifier 120.

In this situation, the audio processing circuit 111 may also instruct the de-pop switch control circuit 119 to turn off the de-pop switch 118, so that the multifunction signal pin 115 outputs a reference voltage generated by the audio processing circuit 111 to the second input terminal of the active amplifier 120.

In another embodiment, the audio processing circuit 111 may instruct the de-pop switch control circuit 119 to turn on the aforementioned de-pop switch 118, so that the multifunction signal pin 115 couples the second input terminal of the active amplifier 120 to the second fixed-voltage terminal. That is, the voltage level of the second fixed-voltage terminal is utilized to be the reference voltage of the active amplifier 120.

In this embodiment, the second fixed-voltage terminal may have the same voltage level as the first fixed-voltage terminal.

The active amplifier 120 generates a corresponding amplified signal according to the analog output signal Sout generated by the output driver circuit 112, and utilizes the amplified signal to drive the speaker 130 in the subsequent stage.

On the other hand, when the audio processing circuit 111 and the output driver circuit 112 enter into the power saving mode, or the power of the de-pop switch control circuit 119 is interrupted, the de-pop switch control circuit 119 stops outputting control signal to the de-pop switches 116 and 118, but the de-pop switches 116 and 118 would both stay in the turned-on status in this moment. In other words, when the audio processing circuit 111 and the output driver circuit 112 operate in the power saving mode, or the de-pop switch control circuit 119 is not powered, the de-pop switches 116 and 118 would both stay in the turned-on status. In this situation, the de-pop switch 116 couples the analog signal pin 113 to the first fixed-voltage terminal, while the de-pop switch 118 couples the multifunction signal pin 115 to the second fixed-voltage terminal.

It can be appreciated from the foregoing descriptions that when the audio processing circuit 111 and the output driver circuit 112 enter into the power saving mode, or the power of the de-pop switch control circuit 119 is interrupted, the de-pop switches 116 and 118 would both stay in the turned-on status by themselves. Therefore, the two signal input terminals of the active amplifier 120 are respectively coupled with the first fixed-voltage terminal and the second fixed-voltage terminal. As a result, none of the two signal input terminals of the active amplifier 120 would become floating.

On the other hand, when the audio processing circuit 111 and the output driver circuit 112 enter into the power saving mode, or the power of the de-pop switch control circuit 119 is interrupted, noises caused by various capacitive coupling effects or inductance effects at the signal input terminals of the active amplifier 120 would be conducted to the fixed voltage terminals, such as the ground terminal, through the aforementioned de-pop switches 116 and 118, instead of being received by the active amplifier 120.

In other words, the audio codec circuit 110 in FIG. 2 not only effectively avoids the signal input terminals of the active amplifier 120 from becoming floating, but also effectively avoids the signal input terminals of the active amplifier 120 from receiving noises caused by various capacitive coupling effects or inductance effects. In this way, it can avoid the active amplifier 120 from outputting erroneous signals to the speaker 130 in the later stage, thereby eliminating or reducing the undesirable pop-noises generated by the speaker 130.

From another aspect, this means that the audio codec circuit 110 in FIG. 2 is allowed to enter into the power saving mode whenever needed, without causing the speaker 130 to generate pop-noises.

The foregoing descriptions regarding the connections, implementations, operations, and related advantages of other components in FIG. 1 are also applicable to embodiments in FIG. 2. For the sake of brevity, those descriptions will not be repeated here.

In some embodiments, some of the aforementioned de-pop switches may be omitted to simplify the complexity of circuit controlling.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. An audio codec circuit (110), comprising:

an audio processing circuit (111);

an output driver circuit (112) arranged to operably generate a pair of differential analog output signals formed by a first analog signal (Sout+) and a second analog signal (Sout−) according to an output signal of the audio processing circuit (111);

a first analog signal pin (113) coupled with the output driver circuit (112) and arranged to operably output the first analog signal (Sout+) to a first input terminal of an active amplifier (120);

a second analog signal pin (114) coupled with the output driver circuit (112) and arranged to operably output the second analog signal (Sout−) to a second input terminal of the active amplifier (120);

a multifunction signal pin (115) coupled with the audio processing circuit (111) and a common-mode voltage input terminal of the active amplifier (120), and arranged to operably provide different signal transmission functionalities according to a configuration of the audio processing circuit (111);

at least one de-pop switch (116; 117; 118) arranged between the first analog signal pin (113) and a first fixed-voltage terminal, between the second analog signal pin (114) and the first fixed-voltage terminal, or between the multifunction signal pin (115) and a second fixed-voltage terminal; and a de-pop switch control circuit (119) coupled with the audio processing circuit (111) and the at least one de-pop switch (116; 117; 118), and arranged to operably control the at least one de-pop switch (116; 117; 118) according to an instruction from the audio processing circuit (111).

2. The audio codec circuit (110) of claim 1, wherein the at least one de-pop switch (116; 117; 118) stays in a turned-on status when the output driver circuit (112) operates in a power saving mode, or the de-pop switch control circuit (119) is not powered.

3. The audio codec circuit (110) of claim 2, wherein when the output driver circuit (112) operates in a normal operating mode, the de-pop switch control circuit (119) turns off the at least one de-pop switch (116; 117; 118).

4. The audio codec circuit (110) of claim 2, wherein the at least one de-pop switch (116; 117; 118) comprises:

a first de-pop switch (116) arranged between the first analog signal pin (113) and the first fixed-voltage terminal;

a second de-pop switch (117) arranged between the second analog signal pin (114) and the first fixed-voltage terminal; and a third de-pop switch (118) arranged between the multifunction signal pin (115) and the second fixed-voltage terminal;

wherein when the output driver circuit (112) operates in the power saving mode, or the de-pop switch control circuit (119) is not powered, the first de-pop switch (116) couples the first analog signal pin (113) with the first fixed-voltage terminal, the second de-pop switch (117) couples the second analog signal pin (114) with the first fixed-voltage terminal, while the third de-pop switch (118) couples the multifunction signal pin (115) with the second fixed-voltage terminal.

5. The audio codec circuit (110) of claim 4, wherein when the output driver circuit (112) operates in a normal operating mode, the de-pop switch control circuit (119) turns off the first de-pop switch (116) and the second de-pop switch (117).

6. An audio codec circuit (110), comprising:

an audio processing circuit (111);

an output driver circuit (112) arranged to operably generate an analog output signal (Sout) according to an output signal of the audio processing circuit (111);

an analog signal pin (113) coupled with the output driver circuit (112) and arranged to operably output the analog output signal (Sout) to a first input terminal of an active amplifier (120);

a multifunction signal pin (115) coupled with the audio processing circuit (111) and a second input terminal of the active amplifier (120), and arranged to operably provide different signal transmission functionalities according to a configuration of the audio processing circuit (111);

at least one de-pop switch (116; 118) arranged between the analog signal pin (113) and a first fixed-voltage terminal, or between the multifunction signal pin (115) and a second fixed-voltage terminal; and a de-pop switch control circuit (119) coupled with the audio processing circuit (111) and the at least one de-pop switch (116; 118), and arranged to operably control the at least one de-pop switch (116; 118) according to an instruction from the audio processing circuit (111).

7. The audio codec circuit (110) of claim 6, wherein the at least one de-pop switch (116; 118) stays in a turned-on status when the output driver circuit (112) operates in a power saving mode, or the de-pop switch control circuit (119) is not powered.

8. The audio codec circuit (110) of claim 7, wherein the output driver circuit (112) operates in a normal operating mode, the de-pop switch control circuit (119) turns off the at least one de-pop switch (116; 118).

9. The audio codec circuit (110) of claim 7, wherein the at least one de-pop switch (116; 118) comprises:

a first de-pop switch (116) arranged between the analog signal pin (113) and the first fixed-voltage terminal; and a second de-pop switch (118) arranged between the multifunction signal pin (115) and the second fixed-voltage terminal;

wherein when the output driver circuit (112) operates in the power saving mode, or the de-pop switch control circuit (119) is not powered, the first de-pop switch (116) couples the analog signal pin (113) with the first fixed-voltage terminal, and the second de-pop switch (118) couples the multifunction signal pin (115) with the second fixed-voltage terminal.

10. The audio codec circuit (110) of claim 9, wherein the output driver circuit (112) operates in a normal operating mode, the de-pop switch control circuit (119) turns off the first de-pop switch (116).

* * * * *